United States Patent Office 3,595,776
Patented July 27, 1971

3,595,776
PLASTICIZER MATERIALS DERIVED FROM CRUDE OILS
Donald D. Davidson, Pasadena, and Bernard K. Mueller, Bakersfield, Calif., assignors to Witco Chemical Corporation, New York, N.Y.
No Drawing. Filed July 15, 1968, Ser. No. 744,670
Int. Cl. C10g 17/06, 31/14
U.S. Cl. 208—14                                6 Claims

ABSTRACT OF THE DISCLOSURE

Preparation of petroleum-derived hydrocarbon oils which have particular utility as secondary plasticizers for synthetic polymers and elastomers. A lubricating oil fraction having an initial high content of aromatics is solvent extracted to produce an extract having an aromatics content of at least 87%, said extract is admixed with a strong mineral acid, the sludge which forms is separated, the remaining acid oil is neutralized, then subjected to vacuum distillation, and is then advantageously hydrogenated.

---

This invention relates to the preparation of a new class of petroleum-derived hydrocarbon oils which are particularly suitable for use as secondary plasticizers for synthetic polymers and elastomeric materials.

The ever-expanding uses of synthetic polymers, such as vinyl chloride polymers and copolymers, polyvinyl acetate, cellulose esters, and rubbery materials such as the copolymers of butadiene with styrene or acrylonitrile, and the copolymers of isobutylene with small amounts of a diolefin such as isoprene have created a large demand for suitable plasticizers in the processing of these materials. The most widely accepted and effective plasticizers presently known, generally speaking, are the organic esters such as dioctyl phthalate, dibutylphthalate, di-z-ethyl-hexyl phthalate, tri-z-ethyl-hexyl phosphate and the like. These plasticizers are relatively expensive and the supply at times, has been unable to keep pace with the demand.

The search for less expensive and more readily available plasticizers has resulted in the development of various petroleum-derived materials as, for example, are disclosed in U.S. Pats. Nos. 2,334,582; 2,498,453; 2,778,808; 2,945,833; 2,948,695; 3,193,497 and 3,259,602 which are usable as plasticizers or plasticizer extenders for polymers or elastomers. Generally, however, it has been found that petroleum-derived fractions usable as plasticizers or plasticizer extenders exhibit certain limitations as to compatibility, color stability, shelf life and general processing characteristics.

In accordance with the present invention, it has been discovered that highly desirable, low cost hydrocarbon materials which are particularly suitable for use as secondary plasticizers in polymeric and elastomeric materials can be produced from petroleum-derived oils containing a substantial content of cyclic unsaturated compounds, namely, naphthenic and aromatic compounds, hereafter called aromatics. Thus, according to this invention, by way of illustration, a process comprising the steps of subjecting a crude oil or lubricating oil fraction having a distillation range of between about 650 degrees F. and 850 degrees F., an aromatics content of at least 60% by weight and a pour point below about 0 degrees F., obtained from a crude oil of substantial aromatics constituency, to a treatment with a solvent, selective for aromatics, separating the extract from the raffinate and treating the extract with a strong mineral acid preferably at a temperature within the range of about 120 degrees F. and 180 degrees F., separating the acid sludge from the acid oil and neutralizing the acid oil, and then vacuum distilling the neutralized oil results in a hydrocarbon oil which is particularly suitable as a plasticizer for polymeric and elastomeric materials.

The crude oil fractions useful as starting materials in the process of producing the plasticizer materials of the present invention include lubricating oil distillates having a distillation range of between about 650 degrees F. and 850 degrees F., an aromatics content of at least 60% and better still at least about 75 or 80%, a specific gravity of about 0.98 and a pour point of less than about 0 degrees F., obtained from crude oils of substantial aromatics constituency. Solvent extracted lubricating oil distillates that have been subjected to extraction with a solvent selective for aromatics and have an aromatics content of at least about 80% by weight are most advantageously employed as the feedstock for the process of the present invention. Solvent extraction processes for lubricating oil distillate fractions are, per se, well known and various non-reactive, highly polar, aromatically preferential solvents may be used, such as furfural, dimethylsulfoxide, phenol, cresylic acid, and nitrobenzene, and the like. Particularly suitable is furfural. These extracts are very complex mixtures of compounds which are predominantly aromatic hydrocarbons, particularly unsaturated aromatics, although compounds containing oxygen, nitrogen and sulfur are also present. The lubricating oil fractions are most favorably obtained from naphthenic or aromatic crudes and those from naphthenic California and Gulf Coast crudes are especially suitable.

The solvent extraction step of the present invention may be carried out in either a batch of continuous system similar to the process or system used to make the lubricating oil extracts suitable as a starting material in the process of the present invention for the production of the plasticizer materials. As indicated above, furfural, which can be used alone, but advantageously in admixture with water, is a particularly suitable extraction solvent for use in the solvent extraction step of the present invention. The solvent extraction is controlled to produce an extract with paraffin or saturated component as low as is reasonably possible, especially less than 9% and, in any event, not more than 12% by weight, and to achieve this result the solvent extraction procedure may be prolonged, for instance, to of the order of 3 to 4 days. The amount of solvent employed may vary from 50 to 200 volume percent, and preferably from about 80 to 150 volume percent, of feed material, for instance, where furfural is used. The solvent extraction temperature may vary from about 50 degrees F. to 125 degrees F. and the pressure from atmospheric to 50 p.s.i.g.

The acid treating step of the process of the present invention comprises contacting the extract from the solvent extraction step with a quantity of strong mineral acid, with agitation, permitting the acid sludge formed to settle and then separating the sludge from the acid oil. Sulfuric acid is preferred for this purpose although other strong mineral acids such as phosphoric, formic, hydrochloric or hydrobromic acid may also be used. The use of concentrated acid is preferred although more dilute aqueous acids can be used. Sulfuric acid of about 75 to 100% strength is particularly suitable.

The amount of acid used in the treatment will vary with the particular acid employed, the strength of the acid, the particular extract being treated, and the extent of treatment desired. With concentrated sulfuric acid (about 85% strength) excellent results are obtained by treatment with about 35 to 60 pounds of acid per barrel of extract to be treated. While the extract can be contacted with the total amount of acid in a single treatment, it is ordinarily preferred to divide the extract into several portions and successively contact the extract with remaining portions of fresh acid. Thus, for example, in treating the extract with a total amount of 54 pounds of 85% sulfuric acid, the extract is treated with one-third of the total amonut or 18 pounds of the acid, the acid sludge formed is separated, and the acid treatment is repeated two additional times with the remaining portions of fresh acid. The acid treatment is ordinarily effected at temperatures between about 120 degrees F. and 180 degrees F. although the extract can be treated at somewhat higher or lower temperatures.

After completion of the acid treating step and separating the acid sludge formed, the acid oil is neutralized to insure that no free acid or compounds formed with the acid remain in the extract. Illustrative examples of alkaline materials capable of neutralizing strong acids are, for example, sodium hydroxide, potassium hydroxide, calcium hydroxide, quicklime, sodium carbonate or bicarbonate, potassium carbonate, magnesium hydroxide, ammonia, and the like, and mixtures thereof. The treated extract can be neutralized by contact and agitation with an aqueous solution or suspension of the alkaline or basic agent at temperatures between 120 degrees F. and 180 degrees F. A particularly advantageous procedure for neutralizing the acid oil is to add 20° Baumé sodium hydroxide in the amount of about 5% by weight, based on the acid oil, to the sludge-free oil with vigorous agitation while maintaining the batch temperature between about 160 degrees F. and 180 degrees F. The neutralized batch is then fed into the vacuum distillation equipment. The acid treatment step of the process of the present invention serves to reduce the nitrogen-containing compounds in the oil, and particularly the basic nitrogen content, the presence of which adversely affects the shelf life and color stability. In general, the total nitrogen content of the lubricating oil fractions employed as a starting material in the process of the present invention commonly is found to exceed 2000 p.p.m. and basic nitrogen to exceed 750 p.p.m. To achieve the full advantages of our invention, the basic nitrogen content of the oil, in the acid treatment step, should be reduced to distinctly less than 100 p.p.m. particularly less than 75 and, especially, to 50 p.p.m. or lower.

The removal of moisture from the oil is effected by vacuum distillation, advantageously under a vacuum of about 20 mm. Hg or lower. It is essential that the final distilled product be substantially free of metal ions, (i.e., not greater than about 0.005% by weight) such as, for example, the alkali metal and alkaline earth metals that are added during the neutralization step, and the vacuum distillation treatment is so carried out and controlled that this extremely low metal content is achieved.

The process steps of solvent extraction, acid treatment, neutralization and vacuum distillation in accordance with the present invention provide a hydrocarbon oil plasticizer that is particularly suitable for many applications, for instance, as a secondary plasticizer for synthetic polymers and elastomeric materials. The treatment provides a secondary plasticizer that is compatible with polymers and elastomers, exhibits good shelf life and color stability and is highly suitable as a replacement for substantial portions of primary plasticizers such as the alkyl organic esters.

In those instances in which it is desired that the plasticizers of the present invention have a lighter color and exhibit somewhat greater shelf life and heat stability characteristics, this may be achieved by a catalytic hydrogenation treatment of said plasticizers. Various hydrogenation catalysts may be employed and methods for manufacturing such catalysts are known. Illustrative of such known hydrogenation catalysts are metals such as copper, magnesium, cobalt, molybdenum, zinc, tin, vanadium, chromium, iron, nickel, platinum, etc., or oxides or sulfides of such metals, or combinations of a plurality of such metals, oxides or sulfides. Any suitable known support for the hydrogenation catalyst can be employed, for example, activated carbon, alumina, bauxite, charcoal, silica, silica-alumina compositions, etc. A preferred catalyst is cobalt/molybdenum supported on alumina. In the hydrogenation step, a temperature of from about 500 degrees F. to 650 degrees F. and preferably between about 500 degrees F. and 625 degrees F., a pressure range from about 750 p.s.i.g. to 950 p.s.i.g., a liquid hourly space velocity within the range of about 0.1 and 5.0 and preferably between about 1.5 and 2.5 volumes of oil per volume of catalyst bed, and a ratio of hydrogen to oil of about 1800 to 2200 cubic feet of hydrogen per barrel of oil may be employed.

The novel hydrocarbon oil plasticizer materials of the present invention are, in at least most cases, characterized by a specific gravity in the range of 0.970 to 1.10 at 60 degrees F.; a viscosity SSU at 100 degrees F. in the range of about 200 to 260; total nitrogen content below 700 p.p.m. and advantageously in the range of about 175 to 375 p.p.m.; a basic nitrogen content not exceeding 100 p.p.m. and, better still, not exceeding 75 p.p.m. and especially in the range of 15 to 50 p.p.m.; a saturated component in the range up to about 12% and, better still, in the range of about 8 to 9.5%; and an aromatics content in the range of about 87 to 95%. The color of said plasticizer materials is somewhat variable, depending, among other things, on whether the hydrogenation step is or is not utilized. Where said hydrogenation step is not utilized, the color is commonly in the range of about 2 and 15; and, where the hydrogenation step is utilized, the color value is appreciably lower, being commonly of the order of about 2 to 7, measured on the Gardner scale.

The hydrocarbon oil plasticizers of the present invention, from a chemical standpoint, are complex mixtures which, on the basis of various analytical data, appear to comprise principally a mixture of substituted alkyl ($—C_5H_{11}$ to $C_{11}H_{23}$ or a number of smaller alkyl groups totaling this aggregate amount) condensed ring [partially hydrogenated (naphthenic) where the hydrogenation step is utilized] and partly aromatics consisting of 2, 3 and 4 rings exemplified by alkyl ($C_3$, $C_4$, $C_5$) substituted tetrahydro and decahydro naphthalenes; alkyl ($C_5$–$C_9$) substituted tetrahydro and decahydro phenanthrenes or anthracenes; and alkyl ($C_7$–$C_{13}$) substituted tetrahydro chrysenes or pyrenes. The compositional characteristics, however, are variable depending, for instance, on the particular source of the naphthenic or aromatic crudes.

The hydrocarbon oils produced in accordance with the practice of the persent invention have wide applicability as plasticizers for polymeric and elastomeric materials and, particularly, as a replacement for a portion of the primary organic ester plasticizers wherein the combined plasticizer system is characterized by high compatibility, unusually good processing characteristics, excellent thermal stability, low volatility, good electrical resistivity and excellent resistance to extraction and migration. In general, when employed with polyvinyl chloride resin, excellent properties are obtained when used to replace about 50% or somewhat more of the primary organic ester plasticizer. The proportions of the hydrocarbon oil plasticizers utilized to plasticize the synthetic polymers and elastomers are quite variable, being dependent on a number of factors including the particular polymer or elastomer involved, the desired extent of plasticizing sought, and whether and to what extent another plasticizer is utilized such as the esters as, for instance, dioctyl phthalate, dibutyl phthalate or the like. In general, it will commonly be in order to employ from 15 to 50 parts of the hydrocarbon oil plasticizers of the present invention, together with from 20 to 50 parts of an ester plasticizer per 100 parts of synthetic polymer or elastomer.

The invention is further illustrated but not limited as to its scope by the following examples wherein all percentages reported are by weight and all temperatures in degrees F., except where specifically noted otherwise.

EXAMPLE 1

A lubricating oil feedstock having the following properties was employed as the starting material for this example.

| | |
|---|---|
| Gravity, API° | 13.1 |
| Viscosity SSU at 100% | 242.7 |
| Sulfur, weight percent | 0.94 |
| Nitrogen, total p.p.m. | 2103 |
| Nitrogen, basic p.p.m. | 870 |
| Aromatics, weight percent | 82.0 |
| Saturates, weight percent | 18.0 |

The lubricating oil feedstock used was the furfural extract of a lubricating oil distillate derived from a California crude.

The feedstock was extracted with a furfural/water solvent solution containing 2.8—4.0% water employing a solvent to oil ratio of 1.5:1 at a temperature of 85 degrees. After a run of 3 days, the extract obtained was determined to have an API gravity of 9.0 degrees, a saturate content of 6.5% and aromatics content of 93.5%.

A barrel of the extract was heated to about 180 degrees and 18 pounds of 85% sulfuric acid was slowly added to the extract with agitation. The mixture was agitated for about 30 minutes while maintaining the temperature at about 170–180 degrees and then was allowed to stand for about 3 hours to allow the sludge to settle. The treated extract was decanted from the sludge and the treatment was repeated two more times, each time with an additional 18 pounds of fresh 85% sulfuric acid. The acid-treated oil, after freeing it of sludge, was maintained at a temperature of about 170–180 degrees and then about 5% by weight, based on the acid oil, of 20° Baumé sodium hydroxide solution was added to the acid oil with agitation. The neutralized acid oil was cooled and was determined to have an API gravity of 10.2%, a saturate content of 8.2%, an aromatics content of 91.8%, a total nitrogen content of 406 p.p.m. and a basic nitrogen content of 58 p.p.m. The neutralized oil was then distilled under a vacuum of about 20 mm. Hg and a 90% yield of an oil having the following properties was obtained:

| | |
|---|---|
| Gravity (API°) (S.G. 0.994 at 60° F.) | 10.8 |
| Viscosity SSU at 100° F. | 223 |
| Total nitrogen p.p.m. | 190 |
| Basic nitrogen p.p.m. | 35 |
| Saturate content percent | 8.6 |
| Metal ions, percent | 0.004 |
| Color (Gardner) | 8 |

EXAMPLE 2

A solvent extracted lubricating oil fraction having the following properties was used as the starting material in this example:

| | |
|---|---|
| Gravity (API°) | 13.6 |
| Viscosity SSU at 100° F. | 242.6 |
| Flash point ° F. | 345 |
| Fire point ° F. | 380 |
| Sulfur percent | 1.0 |
| Nitrogen, total p.p.m. | 2468 |
| Nitrogen, basic p.p.m. | 1330 |
| Aromatics percent | 81.4 |
| Saturates percent | 18.6 |

The feedstock was treated by the process of Example 1, except that the acid treatment involved the use of 85% sulfuric acid in three steps with 12 pounds per barrel of acid used in each step. The final prepared hydrocarbon oil had the following properties:

| | |
|---|---|
| Gravity (API°) (S.G. 0.991 at 60° F.) | 11.3 |
| Viscosity SSU at 100° F. | 204.9 |
| Nitrogen, total p.p.m. | 349 |
| Nitrogen, basic p.p.m. | 20 |
| Aromatics percent | 90 |
| Saturates percent | 10 |
| Metal ions percent | 0.004 |

EXAMPLE 3

The lubricating oil feedstock of Example 1 was used in this example.

The feedstock was treated by the process of Example 1, except that the furfural/water solvent contained from 2.8% to 3.0% water; the sulfuric acid used for the first treatment had a concentration of 93% and for the last two treatments had a concentration of 85%; and the neutralizing agent was a slurry of 50:50 sodium hydroxide and lime added in an amount of 5% of the acid oil. The oil after the extraction treatment had an API gravity of 10.0°, saturate content of 8.4% and aromatics content of 91.6%. The properties determined after the acid treatment and neutralization were API gravity of 9.8°, saturate content of 8.3% and aromatics content of 91.7%, total nitrogen 532 p.p.m. and basic nitrogen 20.5 p.p.m. The properties determined for the distilled oil were:

| | |
|---|---|
| Gravity (API°) (S.G. 0.007 at 60° F.) | 10.4 |
| Viscosity SSU at 100° F. | 250.8 |
| Total nitrogen p.p.m. | 236 |
| Basic nitrogen p.p.m. | 16 |
| Saturate content percent | 8.6 |
| Metal ions percent | 0.003 |
| Color (Gardner) | 6 |

The distilled oil was then hydrogenated using a cobalt/molybdenum catalyst with a liquid space velocity of 2 at a temperature of about 570 degrees F. The ratio of hydrogen to oil was 2000 cubic feet of hydrogen per barrel of oil.

The properties of the final treated oil were determined to be:

| | |
|---|---|
| Gravity (API°) (S.G. 0.985 at 60° F.) | 12.2 |
| Viscosity SSU at 100° F. | 208 |
| Total nitrogen p.p.m. | 250 |
| Basic nitrogen p.p.m. | 27 |
| Saturate content percent | 9.4 |
| Metal ions percent | 0.004 |
| Color (Gardner) | 3 |

The hydrocarbon oils produced in accordance with the practice of the present invention have been found to be highly satisfactory secondary plasticizers for various polymeric materials as, for example, vinyl halides such as vinylchloride, including copolymers thereof with other polymerizable compounds, such as copolymers of vinyl halides and vinylacetate or vinylidene chloride or other polymerizable compound such as vinyl formate, vinyl butyrate, styrene, methyl acrylate and the like. Other synthetic polymers and elastomers which can be plasticized with the novel hydrocarbon oil plasticizers of our present invention are disclosed, for instance, in various of the previously mentioned patents.

EXAMPLE 4

This example illustrates, in part B, the use of a typical plasticizer prepared in accordance with the practice of the present invention used in a polyvinyl chloride resin formulation, Example A, without the plasticizer of the present invention, being shown for comparison purposes. All parts listed are by weight.

|  | A | B |
|---|---|---|
| Composition: | | |
| Polyvinyl chloride resin | 100 | 100 |
| Dioctyl phthalate | 45 | 30 |
| Petroleum oil resin of Example 1 | | 15 |
| Calcium carbonate | 8 | 8 |
| Clay | 10 | 10 |
| Stabilizer ("Mark OHM") | 2 | 2 |
| Bond test exudation | None | None |
| Tensile strength at 70° F., original, p.s.i | 2,550 | 2,674 |
| Elongation, original, percent | 327 | 283 |
| 100% modulus original, p.s.i | 1,841 | 2,235 |
| Hardness, Shore "D," original | 58 | 60 |
| Heat aged 7 days at 212° F.: | | |
| Tensile strength at 70° F., p.s.i | 2,529 | 2,961 |
| Elongation, percent | 298 | 150 |
| 100% modulus, p.s.i | 2,148 | 2,961 |
| Hardness, Shore "D," | 63 | 70 |

In another example, corresponding to part B except that the plasticizer comprised 30 parts each of dioctyl phthalate and the hydrocarbon oil plasticizer of the present invention, generally similar improved results were obtained, including no exudation on the Bend Test.

EXAMPLE 5

This example illustrates the use of a typical hydrocarbon oil plasticizer in compounded rubber products. All parts listed are by weight.

|  | A | B | C | D |
|---|---|---|---|---|
| Composition: | | | | |
| "Hycar 1052" (Butadiene-acrylonitrile copolymer) | 100 | 100 | 100 | 100 |
| "Age Rite Resin D" (Polymerized trimethyl dihydroquinoline) | 2 | 2 | 2 | 2 |
| Sulfur | 1.5 | 1.5 | 1.5 | 1.5 |
| Stearic acid | 0.5 | 0.5 | 0.5 | 0.5 |
| Carbon black | 60 | 60 | 100 | 100 |
| Plasticizer of Example 1 | 30 | 40 | 50 | 60 |
| Zinc oxide | 5 | 5 | 5 | 5 |
| Methyl tuads (tetramethyl thiuramdisulfide) | 2 | 2 | 2 | 2 |
| Methyl zimate (zinc dimethyl dithiocarbamate) | 1 | 1 | 1 | 1 |

No claim is made broadly herein to the production of hydrocarbon oil plasticizers for use in plasticizing polyvinyl chloride by a procedure involving subjecting an Edeleanu extract of a petroleum distillate, selected from the group consisting of naphthenic and aromatic crudes, to contact with a strong mineral acid, such as sulfuric acid, to effect an appreciable reduction in the nitrogen content of the extract whereby to enhance the stability of the extract; then, after separating the acid sludge which forms, neutralizing the acid extract with an alkali, and then subjecting said neutralized extract to vacuum distillation, such procedure being disclosed, for instance, in the aforementioned U.S. Patent No. 2,498,453. Our invention is distinguished therefrom in, among other things, that the lubricating oil starting fractions must have an aromatic content of at least about 60% which, in turn, are solvent extracted so as to produce an extract which has a paraffin or saturated component content not exceeding 12% and, especially advantageously, not exceeding 9%, and an aromatics content of at least 87%, by weight of said extract. By subjecting such a starting petroleum fraction to the treatment steps involving admixture with a strong mineral acid, sludge removal, neutralization, and vacuum distillation, as described above, novel hydrocarbon oils are obtained with plasticizing properties which are distinctly superior to those which result from the practices described in said U.S. Patent No. 2,498,453 from the standpoints of compatibility, stability, shelf life and other properties of the plasticizers. While it is essential to utilize all of the steps of acidification, removal of sludge, neutralization and vacuum distillation, the order of carrying out said steps is subject to variation, although it is especially advantageous to carry out said steps in the order described above and as is set forth in the examples.

With further regard to the starting petroleum lubricating oil fraction, while it is possible by careful manipulative procedures to obtain a lubricating oil fraction having an aromatics content of at least 60% by weight without resorting to solvent extraction techniques, and then to effect solvent extraction to decrease the saturated component content to not over 12% and to increase the aromatics content to at least about 87%, as a practical proposition, considering usual refinery practices, the starting feedstock will be an organic solvent extract of a lubricating oil distillate having an aromatics content of at least 75% to 80% by weight which, in turn, is further organic solvent extracted, as described above, to lower the saturated component content to 12% or less and to raise the aromatics content to at least about 87%. It is also unnecessary and, indeed, most desirably avoided, to dilute the starting crude oil fractions or extracts, which we employ, with hydrocarbon solvents before the acidification step as is taught by the aforesaid U.S. Patent No. 2,498,453.

With further regard to said Patent No. 2,498,453, it may also be noted that, although said patent teaches that the acid treatment of the Edeleanu extracts effects an appreciable reduction in the nitrogen content of the extracts, which results in enhancing the stability of the extracts, reductions in nitrogen content to at least 60%, and preferably to 10 to 20%, of the nitrogen content of the original Edeleanu extracts are indicated. In the practice of our invention, it has been found that the basic nitrogen content in the oil should be reduced, by the acid treatment, to distinctly less than 100 p.p.m. and, especially advantageously, to 50 p.p.m. or lower to achieve the full advantages of our invention. Furthermore, as we have pointed out above, the vacuum distillation procedure is so carried out or controlled as to bring about a content of metal ions in the finished plasticizer not in excess of 0.005% and, better still, of the order of 0.0005%, by weight.

We claim:

1. A method of producing an improved hydrocarbon oil plasticizer for use in plasticizing synthetic polymers and elastomers which comprises providing a crude oil distillate feedstock having a distillation range of between about 650 degrees F. and 850 degrees F. and an aromatics content of at least 60%, and derived from a naphthenic or aromatic crude, solvent extracting said feedstock to produce an extract in which the saturated components are not more than about 12%, admixing said extract with a strong mineral acid whereby to reduce the basic nitrogen content of said extract to not more than 100 p.p.m., separating from said extract such sludge as is formed by said admixture with said strong mineral acid, admixing said acid extract with an alkaline material to neutralize the acidity in said acid extract, and subjecting said neutralized extract to vacuum distillation.

2. The method of claim 1, in which the crude oil distillate feedstock is a solvent extracted distillate, and wherein said solvent extracted distillate is then extracted with a furthural/water solvent solution containing from about 2.8 to 4% water for a period of time to produce an extract having an aromatic content of at least 87%.

3. The method of claim 1, which includes the step of hydrogenating the vacuum distilled neutralized extract.

4. A method of producing an improved hydrocarbon oil plasticizer for use in synthetic polymers and elastomers which comprises providing a solvent extracted crude oil distillate, derived from a naphthenic or aromatic crude, having a distillation range of between about 650 degrees F. and 850 degrees F., an aromatics content of at least 87% and a saturated component not in excess of about 12%, admixing said extract with a strong mineral acid whereby to reduce the basic-nitrogen content of said extract to not more than 100 p.p.m., separating from said extract such sludge as is formed by said admixture with said strong mineral acid, admixing said acid extract with an alkaline material to neutralize the acidity in said acid extract, and subjecting said neutralized extract to vacuum distillation.

5. An improved hydrocarbon oil plasticizer derived from a solvent extracted crude oil distillate, prepared from a naphthenic or aromatic crude, and having a distillation range between about 650 degrees F. and 850 degrees F., said plasticizer being characterized by a specific gravity in the range of 0.970 to 1.10 at 60 degrees F.; a viscosity SSU at 100 degrees F. in the range of about 200 to 260; a basic nitrogen content in the range up to 100 p.p.m.; a saturated component in the range up to about 12%; and an aromatics content in the range between about 87 and 95%.

6. The plasticizer of claim 5 in which the metal ion content is not greater than 0.005% by weight.

References Cited
UNITED STATES PATENTS

| | | | |
|---|---|---|---|
| 2,498,453 | 2/1950 | Schaerer | 208—254 |
| 2,990,362 | 7/1961 | Fox | 208—271 |
| 3,318,799 | 5/1967 | Acker et al. | 208—14 |
| 3,487,012 | 12/1969 | Plummer et al. | 208—271 |

HERBERT LEVINE, Primary Examiner

U.S. Cl. X.R.

208—87, 254, 264, 271; 260—33.6